(No Model.)
H. OGBORN.
MACHINE BELT HOLDER.
No. 304,749. Patented Sept. 9, 1884.
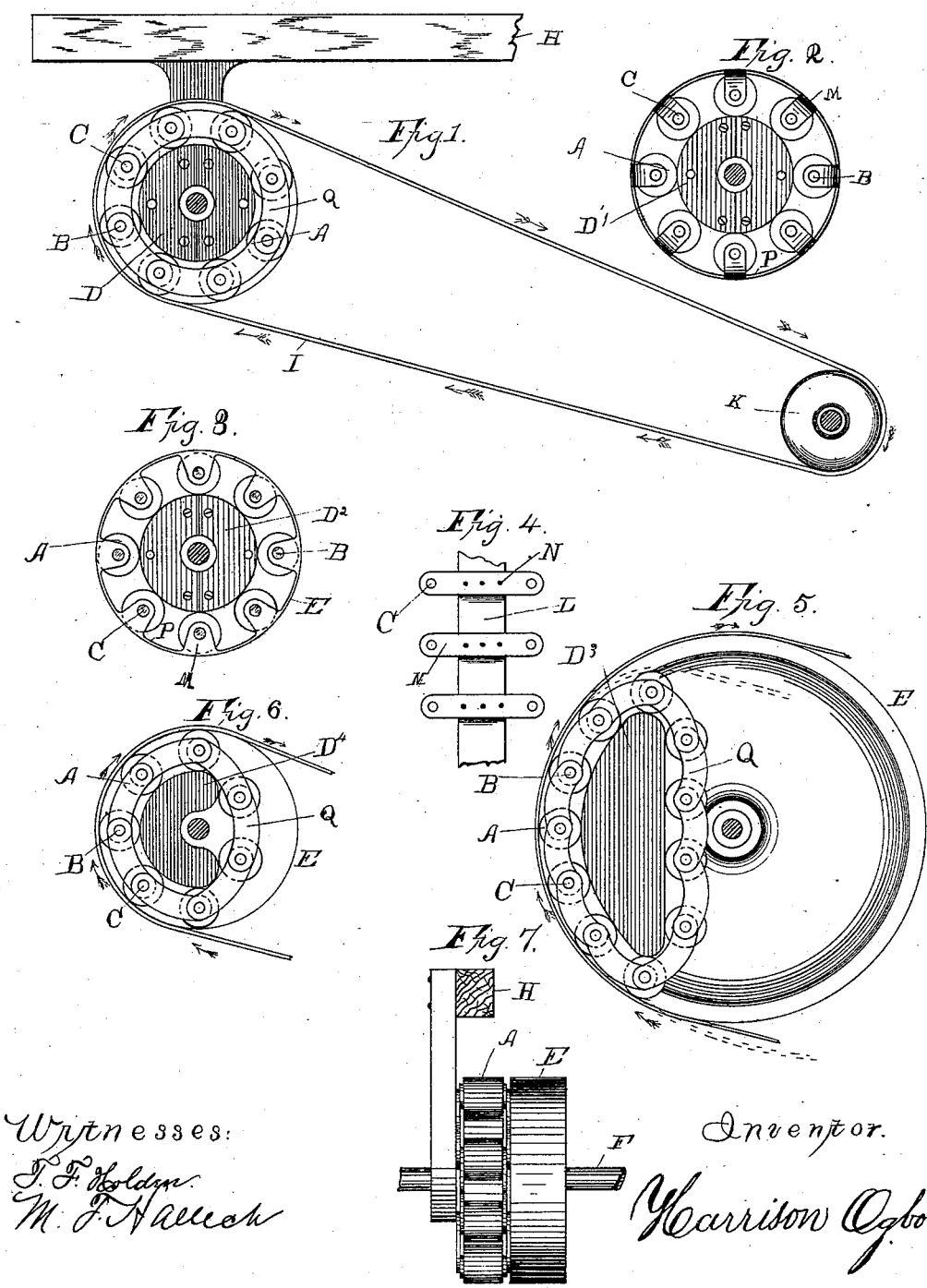
Witnesses:
T. F. Holden.
M. F. Halleck.
Inventor.
Harrison Ogborn.

UNITED STATES PATENT OFFICE.

HARRISON OGBORN, OF RICHMOND, INDIANA, ASSIGNOR TO RHODA C. OGBORN, OF SAME PLACE, AND ROBERT F. PORCH, OF SPICELAND, INDIANA.

MACHINE-BELT HOLDER.

SPECIFICATION forming part of Letters Patent No. 304,749, dated September 9, 1884.

Application filed June 30, 1884. (No model.)

*To all whom it may concern:*

Be it known that I, HARRISON OGBORN, of the city of Richmond, in the county of Wayne and State of Indiana, have invented certain new and useful Improvements in Machine-Belt Holders; and I do hereby declare the following to be a full and complete description thereof, sufficient to enable others to make and use the same, reference being had to the accompanying drawings, specification, and claims.

The invention relates to belt-holders upon which belts are shifted from live-pulleys or drums upon a driving-shaft or other propelling power, and held in a slackened state at rest when not in use, and a great waste of power prevented, and the pulleys, shafts and belting saved from destruction by friction, wear, and strain when not in use, which occurs by the use of the loose pulleys in common use.

The invention consists of a series of pulleys or rollers attached at right angles to an endless chain of links, straps of metal, or other suitable materials, the same being held or retained in position upon said chain Q or strap P by rods passing through said rollers, or by having journals formed on the rollers in any convenient manner and pivoted to said linked chain or strap in any convenient manner. This roller chain or strap rotates when in use, and is at all times held in position by resting on metal, wood, or other suitable blocks or pulleys, D. The blocks or pulleys do not touch or receive any support whatever from the driving-shaft, but are held in position by supports attached to the joists of the building or otherwise.

In the drawings, Figure 1 represents a side elevation of my invention. Fig. 2 is a side elevation of my invention when made as shown in detail in Fig. 4. Fig. 3 is a side elevation when the roller-holder and ear-lugs are formed of a single piece of metal. Fig. 5 is a side elevation of my invention applied to use, where a large pulley is in use to drive the belt. Fig. 6 shows another form of block for the same, with the chain passing around it. Fig. 7 is a rear elevation of my invention.

Like letters of reference indicate corresponding parts in the several drawings.

My invention is supported in position on either side of a live-pulley or driving-drum, upon a line or driving shaft, and takes the place of, and abolishes the inconveniences of, idle-pulleys, and is so arranged that the belt may be easily shifted from the pulley or drum, when not in use, onto the holder, stopped and slackened, and the wear and tear and strain of the belt taken off, and great saving thereby effected, and noise avoided which occurs when all the parts are needlessly kept in motion and on a strain. The holder may be of any desired form and of any suitable size to correspond with the diameter of the pulley for which it is designed.

In the roller-chain, A is the anti-friction roller having pivotal bearings B, and supported on the chain by having the pivotal bearings riveted fast to the chain-links, near the end thereof. Where the rollers are attached to the straps, as in Figs. 2 and 3, the rollers are attached to the metal or leather strap by the axle-bearings B, attached to the rollers, passing through the perforations C, and riveted therein. The pivotal bearings, when riveted in the linked chain, act as rivets to hold the links of the chain together; but when the rollers are attached, as in Figs. 2 and 3, the strap, of metal or leather, is of the proper length to make a chain of the right length to pass around the blocks D D' D² D³ D⁴.

E is the live-pulley. F is the shaft that drives the pulley. G is the hanger that supports block D and the chain and belt when on the belt-holder. H is the beam to which the hanger is attached; I, the belt; K, the small pulley where the power is applied.

L, Fig. 4, is a view of the ears before being bent, and showing, also, how the ears are attached to the strap by rivets N. These ears M are bent as shown in Figs. 2 and 3, and firmly hold the rollers while in use, but allow them to rotate freely. It is not important which form of chain or strap is used, as each carries out the ideas fully of my invention, the principle and effect being the same, notwithstanding the slight difference of construction.

For small pulleys I prefer to use a circular block, D, as it works well in practice for such pulleys; but the form of the block may be used shown in Fig. 6, as a matter of economy, where the pulley is not too small. This pulley must be made enough smaller than the pulley it is to work by the side of so that the added thickness of the rollers will make a belt-holder about the same size of the live-pulley that it is to be placed by the side of. This block D, when made round, should be made in two parts, with a large hole in the center, so that it may be attached to the hanger without disturbing or touching the shaft. This block D should be made as thick as the roller-chain is wide and placed close to the pulley, as shown in Fig. 7. These pulleys must come flush with the driving-belt on the side where the belt approaches the driving-pulley, while at the other side, as in Fig. 5, the belt-holder need not be as full as the pulley, thereby letting the belt lie slack on the belt-holder to get the belts to hang slack. Where the round pulleys are used, it is only necessary to let the belt-holder be a little lower at the top than the pulley, when the belt will be slack when upon it.

For large pulleys, as a matter of economy, I construct the belt-holder as shown in Fig. 5, which answers the purpose perfectly. In this case it forms a segment of a circle, and to relieve the strain on the belt it is made to form a differential curve or segment, so the curve is greater where the belt is leaving it than where it is coming onto the belt-holder, as the belt-holder is placed in such close proximity to the pulley as to be readily shifted from one to the other by the ordinary devices used for shifting belts. The holder may be firmly held by attaching it to hangers already in use, or by braces or frame-work, iron stays, or other suitable means to adapt it to the surrounding conditions.

In using my invention, to throw the belt from the live-pulley onto the belt-holder it is only necessary to use the ordinary means used to shift the belt from a live-pulley to an idle one, when the belt will start the rollers into motion, and thus avoid friction and noise. The roller-chain runs for a few moments, until the momentum of the belt is exhausted, when the belt and chain stop at the same time, and all strain and friction of the belt, shaft, and pulleys cease at once. When it is desired to throw the belt from the belt-holder to the live-pulley, it is done, as before, with an ordinary device used for the purpose, when the belt catches onto the live-pulley and is carried from the belt-holder to the live-pulley, when the machinery will be set in motion.

Having thus described the nature, construction, and operation of my invention, what I claim therein as new and useful, and desire to secure by Letters Patent, is—

1. In a belt-holder, an endless chain, R, supplied with a series of revolving anti-friction rollers, attached thereto in the manner substantially as shown, and for the purposes herein set forth.

2. In a belt-holder, the anti-friction rollers A A and endless chain Q, or their equivalents, in combination with block D, or its equivalent, when used together, for the purposes and in the manner substantially as herein set forth and described.

3. In a belt-holder, the anti-friction rollers A A, pivot-axle B, and supports C, or their equivalents, and endless chain Q, in combination with block $D^t$, or its equivalent, and hanger G, when constructed as specified, and for the uses and purposes herein set forth and described.

4. In a belt-holder, the anti-friction rollers A A, having bearings at the ends, endless chain Q, and block $D^3$, or their equivalents, in combination with hanger G, pulley E, pulley K, and belt I, or their equivalents, when constructed substantially as shown, and for the purposes herein set forth.

5. In a belt-holder, the anti-friction rollers A A, having pivotal journals at the ends, in combination with strap P, ears M, block D', and hanger G, or their equivalents, when constructed as shown, and for the purposes herein set forth and described.

In testimony whereof I have hereunto set my hand this 25th day of June, 1884.

HARRISON OGBORN.

Witnesses:
T. F. HOLDEN,
M. F. HALLECK.